United States Patent [19]

Kamada et al.

[11] Patent Number: 4,520,166
[45] Date of Patent: May 28, 1985

[54] VINYL CHLORIDE POLYMER COMPOSITION

[75] Inventors: Kazumasa Kamada; Norihisa Osaka; Masahiro Kaneda, all of Otake, Japan

[73] Assignee: Mitsubishi Rayon Company, Ltd., Tokyo, Japan

[21] Appl. No.: 477,500

[22] Filed: Mar. 21, 1983

Related U.S. Application Data

[63] Continuation-in-part of Ser. No. 263,725, May 14, 1981, abandoned.

[30] Foreign Application Priority Data

May 20, 1980 [JP] Japan ................................. 55-66893

[51] Int. Cl.$^3$ ............................................. C08L 33/04
[52] U.S. Cl. ..................................... 525/85; 525/261; 525/263; 525/305
[58] Field of Search .................. 525/85, 261, 263, 305

[56] References Cited

U.S. PATENT DOCUMENTS 3,426,101   2/1969   Ryan et al. ............................. 525/85
3,821,329   6/1974   Gallagher ............................... 525/85

*Primary Examiner*—Jacob Ziegler
*Attorney, Agent, or Firm*—Oblon, Fisher, Spivak, McClelland and Maier

[57] ABSTRACT

A vinyl chloride polymer having an excellent workability, lubricating property, and gelling property comprises (1) from 80 to 99.95 weight % of a polymeric ingredient (I) consisting of polyvinyl chloride and/or a copolymer of 80 weight % or more of vinyl chloride with 20 weight % or less of another comonomer and (2) from 0.05 to 20 weight % of a polymeric ingredient (II) consisting of at least one three-stage emulsion polymerization product prepared by first polymerizing, in the presence of a polymeric component (a) consisting of polymethyl methacrylate and/or a copolymer of 50 weight % or more of methyl methacrylate and 50 weight % or less of another comonomer, from 40 to 70 parts by weight of a first monomeric component (b) consisting of an alkyl acrylate ($C_{1-18}$) and/or benzyl acrylate or a mixture of 30 weight % or more of an alkyl acrylate ($C_{1-18}$) and/or benzyl acrylate with 70 weight % or less of an alkyl methacrylate ($C_{1-18}$) and/or benzyl methacrylate under such a polymerization condition that when the monomeric componet (b) alone is polymerized, the resultant product exhibits a reduced viscosity of 1 or less in a concentration of 0.1 g/100 ml of chloroform of 25° C. and by second polymerizing, in the presence of the first polymerization product, from 5 to 40 parts by weight of a second monomeric component (c) consisting of methyl methacrylate or a mixture of 50 weight % or more of methyl methacrylate and 50 weight % or less of another comonomer, the sum of the components (a), (b), and (c) being 100 parts by weight and the preparation of the polymeric component (a) and the first and second polymerizations being carried out by means of an emulsion polymerization method in the presence of a chain transfer agent.

14 Claims, No Drawings

VINYL CHLORIDE POLYMER COMPOSITION

This is a continuation-in-part application from application Ser. No. 263,725, filed on May 14, 1981, and now abandoned.

FIELD OF THE INVENTION

The present invention relates to a vinyl chloride polymer composition having an excellent workability.

BACKGROUND OF THE INVENTION

Vinyl chloride resins have been widely used in various fields due to their excellent physical and chemical properties. However, vinyl chloride resins have various disadvantages from the viewpoint of workability. That is, vinyl chloride polymers have a high melt viscosity, a poor flowability, a narrow temperature range in which the resins can be converted to shaped products because the shaping temperature is close to the thermal decomposition temperature thereof, and a slow gelling rate. For these reasons, these resins are difficult to convert rapidly from a powdery state to a uniform molten state when they are subjected to a roll milling procedure and thus the resultant shaped product later has a degraded surface appearance.

The addition of a plasticizer to vinyl chloride resins in order to eliminate the above-mentioned disadvantages is well known. However, the use of a plasticizer creates some problems due to the plasticizer's volatility and also results in a decreased mechanical property of the resultant shaped product. Accordingly, a plasticizer is useless for producing a rigid polyvinyl chloride-shaped product.

In another attempt to improve the processing properties of vinyl chloride resins, various copolymers compatible with vinyl chloride resins are used as a processing aid to increase the gelling rate of the resins and to reduce the stickiness thereof to the metal surface of the molding machine used, thereby-increasing productivity, so as to obtain a resultant shaped product having a smooth surface, to impart a uniform luster to all shaped products produced when the molding procedure is continuously carried out for a long period of time, and to attain deep drawability in the resultant shaped product. Some of these copolymers are successful in some fields of application. Typical copolymers which are presently marketed are those which contain methyl methacrylate as a main component. These copolymers are effective for promoting the gelling rate of vinyl chloride resins and for increasing the tensile elongation of the resultant shaped product at elevated temperatures. However, these copolymers are disadvantageous in that a film extruded from a vinyl chloride resin having these copolymers incorporated therein is deficient in luster and contains a non-gelled material (which is also referred to as fisheye). These disadvantages detract from the value of the film. Also, the above-mentioned methyl methacrylate copolymers exhibit, in themselves, a high adhesion to a metal surface and have a high melt viscosity. For these reasons, when vinyl chloride resin compositions having copolymers consisting mainly of methly methacrylate incorporated therein are subjected to a molding procedure, a remarkable increase in torque (milling resistance) is encountered, resulting in a decrease in productivity. To overcome these defects, the use of a lubricant in combination with a methyl methacrylate copolymer has been attempted. However, the amount of lubricant which can be used is limited from the standpoint of retention of the physical properties of the vinyl chloride resin composition. In addition, even if a lubricant is used within the permissible range, the vinyl chloride resin composition cannot maintain its lasting lubricating property at a satisfactory level during the shaping process. Moreover, the use of a lubricant is disadvantageous in that the lubricant adheres to the surface of the mold during the molding procedure (this adhesion is also referred to as plate out) and causes blooming on the surface of the resultant shaped product. Accordingly, the use of a lubricant in combination with a methyl methacrylate copolymer is also ineffective for improving the workability of a vinyl chloride resin.

There have also been proposed vinyl chloride polymer compositions capable of overcoming all of the above-mentioned defects in one stroke, i.e., exhibiting an excellent releasing property from a calendering roll when subjected to a calendering procedure and a lasting lubricating property and producing a shaped product having improved fabricating properties, such as high tensile elongation at elevated temperatures, and an excellent deep drawability while retaining the transparency characteristic of the vinyl chloride resin. These compositions yield fairly successful results. However, some of these compositions result in an increase in deposits on the surface of the mold during the molding procedure. Accordingly, it cannot be said that these compositions satisfactorily meet the requirements in the art. Under these circumstances, there is a strong desire for a processing aid capable of further increasing the flowability and lubricity durability of a vinyl chloride resin when it is subjected to a processing procedure from the standpoints of an increase in productivity and quality and a reduction in energy.

The inventors of the present invention made extensive studies in consideration of the above-mentioned problems. As a result, the inventors of the present invention succeeded in obtaining a vinyl chloride polymer composition exhibiting an excellent flowability and a lasting lubricating property and which is free from the plate out phenomenon while retaining excellent processing properties possessed by a vinyl chloride resin having a methyl methacrylate copolymer incorporated therein. Thus, the inventors of the present invention attained the present invention.

SUMMARY OF THE INVENTION

An object of the present invention is to provide a vinyl chloride polymer composition exhibiting an excellent flowability and lubricity durability while retaining improved processing properties imparted by a polymethyl methacrylate and which causes no bleeding or plate out phenomenon during the molding procedure and is transparent.

The vinyl chloride polymer composition of the present invention comprises:

(1) from 80% to 99.95% by weight of a polymeric ingredient (I) consisting of at least one member selected from the group consisting of polyvinyl chloride and copolymers of 80% by weight or more of vinyl chloride and by weight or less of at least one other ethylenically unsaturated comonomer; and (2) from 0.05% to 20% by weight of a polymeric ingredient (II) consisting of at least one three-stage emulsion polymerization product prepared by the steps of:

(A) first polymerizing, in the presence of from 5 to 45 parts by weight of a polymeric component (a) prepared by polymerizing at least one monomeric material (a') selected from the group consisting of methyl methacrylate and monomeric mixtures of 50% by weight or more of methyl methacrylate and 50% by weight or less of at least one other ethylenically unsaturated comonomer in the presence of from 0 to 2.0 parts by weight of a chain transfer agent per 100 parts by weight of the monomeric material (a'), from 40 to 70 parts by weight of a first monomeric component (b) consisting of a member selected from the group consisting of alkyl acrylates in which the alkyl group has from 1 to 18 carbon atoms, benzyl acrylate, mixtures of two or more of the above-mentioned compounds, and monomeric mixtures of 30% by weight or more of at least one member selected from the group consisting of alkyl acrylates in which the alkyl group has from 1 to 18 carbon atoms and benzyl acrylate and 70% by weight or less of at least one member selected from the group consisting of alkyl methacrylates in which the alkyl group has from 1 to 18 carbon atoms and benzyl methacrylate in the presence of 0.1 parts by weight or more of a chain transfer agent per 100 parts by weight of the first monomeric component (b) under a polymerization condition which will cause a solution of 0.1 g of a polymerization product from the first monomeric component (b) alone in 100 ml of chloroform to exhibit a reduced viscosity of 1 or less at a temperature of 25° C. and (B) second polymerizing, in the presence of the first polymerization product, from 5 to 40 parts by weight of a second monomeric component (c) consisting of a member selected from the group consisting of methyl methacrylate and monomeric mixtures of 50% by weight or more of methyl methacrylate and 50% by weight or less of at least one other ethylenically unsaturated comonomer in the presence of from 0 to 1.0 part by weight of a chain transfer agent per 100 parts by weight of the second monomeric component (c), the sum of the polymeric component (a), the first monomeric component (b), and the second monomeric component (c) being 100 parts by weight, and the preparation of the polymeric component (a) and the first and second polymerizations being carried out in the presence of from 0.1 to 20 parts by weight of an emulsifying agent and from 0.05 to 10 parts by weight of an initiator per 100 parts by weight of the sum of the components (a), (b), and (c).

The composition of the present invention preferably comprises:

(1) from 99.9% to 80% by weight of a polymeric ingredient (I) consisting of at least one member selected from the group consisting of polyvinyl chloride and copolymers of 80% by weight or more of vinyl chloride and 20% by weight or less of another ethylenically unsaturated comonomer; and (2) from 0.1% to 20% by weight of a polymeric ingredient (II) consisting of at least one three-stage emulsion polymerization product prepared by the steps of:
(A) first polymerizing, in the presence of from 10 to 45 parts by weight of a polymeric component (a) consisting of at least one member selected from the group consisting of polymethyl methacrylate and copolymers of 80% by weight or more of methyl methacrylate and 20% by weight or less of at least one other ethylenically unsaturated comonomer, from 40 to 70 parts by weight of a first monomeric component (b') consisting of a mixture of from 30% to 70% by weight of at least one member selected from the group consisting of alkyl acrylates in which the alkyl group has from 1 to 18 carbon atoms and benzyl methacrylate and from 30% to 70% by weight of at least one member selected from the group consisting of alkyl methacrylates in which the alkyl group has from 1 to 18 carbon atoms and benzyl methacrylate under a polymerization condition which will cause a solution of 0.1 g of a polymerization product of said first monomeric component (b') alone in 100 ml of chloroform to exhibit a reduced viscosity of 1.0 or less at a temperature of 25° C. and (B) second polymerizing, in the presence of the first polymerization product, from 5 to 40 parts by weight of a second monomeric component (c) consisting of a member selected from the group consisting of methyl methacrylate and monomeric mixtures of 50% by weight or more of methyl methacrylate and 50% by weight or less of at least one other ethylenically unsaturated comonomer under a polymerization condition which will cause a polymerization product of said second monomeric component (c) alone to exhibit a reduced viscosity of 2.0 or more measured at a concentration of 0.1 g/100 ml of chloroform at a temperature of 25° C., the sum of the polymeric component (a), the first monomeric component (b), and the second monomeric component (c) being 100 parts by weight.

DETAILED DESCRIPTION OF THE INVENTION

The vinyl chloride polymer composition of the present invention is characterized by the fact that the polymeric ingredient (II), i.e., the three-stage polymerization product, has a sandwich structure comprising the polymer resulting from the first monomeric component (b) which serves to control the lubricating property of the composition, which polymer (b) is a low molecular weight acrylic ester polymer or copolymer of an acrylic ester and a methacrylic ester, on the inner and outer sides of which the methacrylate polymer component (a) and the polymer derived from the second monomeric component (c) highly compatible with the vinyl chloride polymer are disposed, respectively. This sandwich structure of the three-stage polymerization product is obtained by polymerizing an acrylic ester or a mixture of an acrylic ester and a methacrylic ester (the first monomeric component (b)) in the presence of a polymer or copolymer latex (the polymeric component (a)) comprising at least 50% by weight of methyl methacrylate under conditions such that the polymerization product resulting from the first monomeric component (b) exhibits a reduced viscosity ($\eta$sp/c) of 1.0 or less and then by polymerizing methyl methacrylate or a mixture of 50% by weight or more of methyl methacrylate and 50% by weight or less of at least one other copolymerizable monomer (the second monomeric component (c)) in the presence of the resultant latex comprising the components (a) and (b). These polymerization reactions are carried out by an emulsion-type three-stage polymerization method. In the production of the sandwich structure, it is preferable that the first and second polymerization procedures be carried out without the further addition of an emulsifying agent so as to inhibit the substantial formation of a single polymer of each of the components (b) and (c) themselves. Because of its high softening point, a polymethyl methacrylate having a high degree of polymerization cannot be uniformly dispersed under processing conditions conventionally used for a vinyl chloride resin, resulting in a large amount of non-gelled materials. When a uniform dispersion of the polymethyl methacrylate is attained under intensified processing conditions and the processing is continued until any non-gelled material disappears, the vinyl chloride resin is thermally degraded and the resultant shaped product is useless for practical purposes.

The composition of the present invention comprises a polymeric ingredient (I), that is, a vinyl chloride resin (I), having a polymeric ingredient (II) incorporated therein, that is, a polymerization product (II) which is prepared in such a manner that the first monomeric component (b) is first polymerized on and attached to the outer side of the polymeric component (a), which is a starting constituent of the sandwich structure, the resultant outer portion of the first polymerization product exhibiting a high lubricating property, and then the second monomeric component (c) is second polymerized on the outer side of the first polymerization product, the resultant outer portion of which is highly compatible with the vinyl chloride polymer (I). Therefore, the composition of the present invention exhibits a lasting lubricating property essential for the processing of the vinyl chloride resin. Also, when the composition of the present invention is molded by a blowing method to form a bottle, no drawdown is observed. In the case where the polymeric component (a) exhibits a reduced viscosity ($\eta sp/c$) of 2.0 or more, the presence of this high molecular weight methyl methacrylate is effective not only for obtaining the above-mentioned improved effects but also for increasing the gelling rate of the resultant resin composition and for enhancing the fabricating properties, such as tensile elongation at elevated temperatures, of the resultant shaped product. Also, in the case where the polymeric component (a) exhibits a reduced viscosity ($\eta sp/c$) of less than 2.0, the presence of this low molecular weight methyl methacrylate exhibiting an excellent dispersibility is effective for increasing the flowability of the resultant resin composition and for reducing the occurrence of fisheye, i.e., non-gelled material, in the resultant shaped product. The above-mentioned outstanding effects could not be attained by the conventional vinyl chloride resin composition. It is necessary that the first monomeric component (b) for providing the middle portion of the sandwich structure consist of a member selected from the group consisting of (1) alkyl acrylates in which the alkyl group has from 1 to 18 carbon atoms, (2) benzyl acrylate, (3) mixtures of two or more of the above-mentioned compounds, and (4) a monomeric mixture of 30% by weight or more of at least one member selected from the group consisting of alkyl acrylates in which the alkyl group has from 1 to 18 carbon atoms and benzyl acrylate and 70% by weight or less of at least one member selected from the group consisting of alkyl methacrylates in which the alkyl group has from 1 to 18 carbon atoms and benzyl methacrylate. For instance, in the case where styrene, which is incompatible with the vinyl chloride resin, is contained in the first monomeric component (b), bleeding and plate out tend to occur during the molding of the resultant resin composition, resulting in an increase in deposits on the surface of the mold used during the molding procedure. Also, the resultant resin composition is limited in its lubricity durability.

In the second polymerization product, that is, the polymeric ingredient (II), the polymer resulting from the second monomeric component (c), which polymer is highly compatible with the vinyl chloride polymer (I) and has a high glass transition temperature ($T_g$), is attached to the outer side of the first polymerization product. The present invention provides a polymer having a sandwich structure which is prepared by a three-step polymerization method and exhibits a combination of excellent workability and a lasting lubricating property due to the synergistic effect of the respective components (a), (b), and (c), particularly of the methacrylic ester and acrylic ester constituting the component (b). The intended composition of the present invention is obtained by incorporating the polymer having the above-mentioned structure and composition into the vinyl chloride resin. The sandwich structure of the polymer (II) is a very important requisite for enhancing the lubricating property or releasability from a metal surface of the vinyl chloride polymer composition and for preventing the polymer composition from causing a bleeding or plate out phenomenon. Even if the polymer (a) and the single polymers resulting from the monomeric components (b) and (c), respectively, are used or a polymer prepared by polymerizing the monomers of the components (a), (b), and (c) in a single step is used, the resultant polymer composition cannot exhibit an excellent lubricating property. Also, even if a polymer having a two-layered structure which is prepared by polymerizing the component (a) or (c) with the outer side portion of the polymer resulting from the component (b) is used, a vinyl chloride polymer composition containing such a polymer is inferior to a vinyl chloride polymer composition containing a polymer having the sandwich structure in respect to its releasability from a metal surface and durability of the lubricating property. In addition, in the case where a polymer comprising a core of the polymeric component (a) around which the polymer resulting from the component (b) is present as the outer layer and which contains no component (c) is prepared, blocking occurs during the coagulating and drying procedures because of the low glass transition temperature ($T_g$) of the polymer resulting from the component (b), thereby making it difficult to industrially produce the polymer in the form of fine particles capable of being dispersed in the vinyl chloride resin.

The polymer (II) used in the composition of the present invention contains the polymeric component (a) in an amount of from 5 to 45 parts by weight, preferably from 10 to 45 parts by weight, more preferably from 20 to 40 parts by weight, per 100 parts by weight of the polymer. When the polymeric component (a) is greater than 45 parts by weight, the resultant composition exhibits a poor lubricating property and also a decreased durability of its lubricating property. Contrary to this, the polymeric component (a) content of less than 5 parts by weight in the polymer (II) deteriorates the workability, other than the lubricating property, of the resultant composition and lowers the lubricity durability thereof. Also, when the reduced viscosity ($\eta sp/c$) of the polymeric component (a) is 2.0 or more, the resultant composition exhibits excellent fabricating properties and lubricity durability. On the other hand, in the case where the reduced viscosity ($\eta sp/c$) of the polymeric component (a) is less than 2.0, the resultant polymer (II) exhibits an excellent dispersibility in the vinyl chloride polymer (I), and the vinyl chloride polymer (I) with the polymer (II) dispersed therein exhibits an excellent flowability and lubricity durability. The polymeric component (a) is a polymethyl methacrylate or a copolymer comprising at least 50% by weight of methyl methacrylate. The comonomer for the methyl methacrylate is not particularly limited and may be any suitable ethylenically unsaturated monomer, depending on the end use of the resultant composition. For example, the comonomer may be at least one member selected from the group consisting of aromatic vinyl monomers, unsaturated nitriles, vinyl esters, acrylic esters, and methacrylic esters other than methyl methacrylate. Moreover, the polymeric component (a) may also contain a polyfunctional monomer such as divinyl benzene or aklyl methacrylate. In this case, it is preferable that the polyfunctional monomer be used in an amount of 2.0% by weight or less.

The first monomeric component (b) is used in an amount of from 40 to 70 parts by weight, preferably from 50 to 60 parts by weight, per 100 parts by weight of the polymer. A component (b) content of less than 40 parts by weight causes the resultant composition to exhibit a degraded lubricating property. Also, a component (b) content exceeding 70 parts by weight in the polymer causes the resultant composition to exhibit degraded processing properties, such as a poor surface property and luster. A remarkable feature of the first polymerization is that the monomeric component (b) is polymerized in a very small molecular weight. That is, in order to ensure that the resultant composition has an excellent lubricity durability, the first polymerization should be carried out under such a condition that a polymer resulting from the monomeric component (b) alone exhibits a reduced viscosity ($\eta sp/c$) of 1.0 or less, preferably about 0.5. If the reduced viscosity ($\eta sp/c$) of the polymer exceeds 1.0, the lubricating effect thereof is lowered, eventually resulting in a degraded lubricating property of the resultant polymer composition. The monomeric component (b) comprises from 30% to 100% by weight of at least one acrylic ester and from 0% to 70% by weight of at least one methacrylic ester. In the case where the content of acrylic ester is greater than 70% by weight, the resultant composition exhibits an excellent lubricating property, an enhanced releasability from a metal surface, and a high extrusion rate although the gelling rate thereof becomes slow. When the content of the acrylic ester is less than 30% by weight, the resultant composition exhibits an extremely poor lubricating property. The acrylic ester usable for the first monomeric component (b) may be selected from the group consisting of methyl acrylate, ethyl acrylate, n-propyl acrylate, isopropyl acrylate, n-butyl acrylate, isobutyl acrylate, tert-butyl acrylate, octyl acrylate, 2-ethylhexyl acrylate, and benzyl acrylate. The methacrylic ester usable for the first monomeric component (b) may be selected from the group consisting of methyl methacrylate, ethyl methacrylate, n-butyl methacrylate isobutyl methacrylate, benzyl methacrylate, lauryl methacrylate, cyclohexyl methacrylate, and 2-ethylhexyl methacrylate. Among these examples of the acrylic and methacrylic esters, monomers capable of producing a polymer having a low glass transition temperature, for example, n-butyl acrylate, 2-ethylhexyl acrylate, n-butyl methacrylate, and 2-ethylhexyl methacrylate, are preferably used. In order for the first monomeric component (b) to exhibit its functions satisfactorily, the acrylic ester and the methacrylic ester of which the component (b) is composed should be polymerized in the form of a random copolymer. It is not preferable that the acrylic ester be allowed to graft onto the methacrylic ester or vice versa. That is, if the polymer resulting from the component (b) contains, for example, butyl acrylates linked to each other so as to form a block, the resultant polymer composition exhibits no transparency at all.

The second monomeric component (c) is used in an amount of from 5 to 40 parts by weight per 100 parts by weight of the polymer. If the amount of the component (c) is less than 5 parts by weight, the resultant composition cannot exhibit a satisfactory workability. In addition, the composition tends to undergo secondary aggregation during subsequent processes such as coagulation, dehydration, and drying, resulting in a poor productivity. Also, if the content of the component (c) is greater than 40 parts by weight, the resultant composition exhibits no lasting lubricating property. The component (c) may contain less than 50% by weight of any monomer copolymerizable with methyl methacrylate. However, in order to ensure that the resultant composition exhibits an excellent flowability, it is preferable that the component (c) consist of a methyl methacrylate monomer only.

The second polymerization may be carried out under any polymerization conditions to produce a polymer composition having a high lubricity durability, which is an important feature of the present invention. However, in the case where great importance is placed on the workability, for example, the drawdown-preventing property, of the resultant polymer composition, the second polymerization procedure is preferably carried out under such a condition that a polymer from the second monomeric component (c) alone exhibits a reduced viscosity of more than 2.0. Also, in the case where great importance is placed on the dispersibility of the polymer (II) and on the elimination of fisheye-like defects, it is preferable that the second polymerization be carried out under such a polymerization condition that the polymerization product of the second monomeric component (c) alone exhibits a reduced viscosity of 2.0 or less. In each case, it is desirable to avoid the production of a polymethyl methacrylate fraction having an extremely high degree of polymerization and a high softening temperature because this type of polymethyl methacrylate fraction has a poor dispersing property in the polymer composition of the present invention under the usual condition under which the vinyl chloride polymer composition is processed and does not fuse at the usual shaping temperature.

The polymer (II) is prepared by an emulsion polymerization method in the presence of from 0.1 to 20 parts by weight, preferably from 0.1 to 10 parts by weight, of an emulsifying agent and from 0.05 to 10 parts by weight, preferably from 0.1 to 10 parts by weight, of an initiator per 100 parts by weight of the sum of the components (a), (b), and (c).

The reduced viscosity ($\eta sp/c$) of the polymer is adjusted by using a specific amount of a chain transfer agent.

The emulsifying agent may consist of at least one surface active agent selected from: the group consisting of anionic surface active compounds, for example, fatty acid salts, alkylbenzene sulfonic acid salts, alkylnaphthalene surfonic acid salts, alkylsulfosuccinic acid salts, alkylphosphoric ester salts, polyoxyethylenealkyl sulfuric ester salts, polyoxyethyleneethersulfate salts, and sarcosinic acid salts; nonionic surface active compounds, for instance, polyoxyethylenealkylethers, polyoxyethylenealkylphenolethers, polyoxyethylenesorbitane fatty acid esters, sorbitane fatty acid esters, polyoxyethylene fatty acid esters, polyethylene glycol fatty acid esters, and polyoxyethylenealkylether phosphoric esters; and cationic surface active compounds, for example, alkylamine salts, quaternary ammonium salts, and polyoxyethylenealkylamines.

The initiator may consist of at least one compound selected from: the group consisting of inorganic initiating persulfates, for example, sodium persulfate, ammonium persulfate, and potassium persulfate; the group consisting of organic peroxides, for example, benzoyl peroxide, lauroyl peroxide, acetyl peroxide, tert-butylhydroperoxide, di-tert-butylhydroperoxide, cumenhydroperoxide, di-isopropylbenzene peroxide, tert-butylperoxyacetate, tert-butyl peroxybenzoate, tert-butyl peroxyisopropylcarbonate and di-isopropyl peroxydicarbonate; the group consisting of azo compounds, for example, azo-bis-isobutylonitrile, azo-triphenylmethane, and azo-diphenylmethane; and redox mixtures of at least one member selected from the above-mentioned groups of compounds and at least one member selected from the group consisting of sulfites, hydrogen sulfites, thiosulfates, pyrophosphates, ascorbic acid, sodium formaldehyde sulfoxylate, hydrazine, tris- and tetraethylene tetramines, sodium dithionite, ferrous salts, and copper sulfates.

The chain transfer agent may consist of at least one member selected from: the group consisting of alkyl mercaptans having from 4 to 20 carbon atoms, for example, n-butyl mercaptan, n-octyl mercaptan, n-dodecyl mercaptan, n-tetradecyl mercaptan, stearyl mercaptan, t-butyl mercaptan, t-nonyl mercaptan, and t-hexylmercaptan; the group consisting of aromatic mercaptans, for example, thiophenol and benzyl mercaptan; the group consisting of organic sulfur compounds, for example, butyl thioglycolate, octyl thioglycolate, methoxybutyl thioglycolate, octyl β-mercaptopropionate, and methoxybutyl β-mercaptopropionate; and the group consisting of thioglycol compounds, for example, thioglycol, octyl thioglycol, thiopentaerythritol, and thioglycerol. The chain transfer agent is used in an amount of from 0 to 20 parts by weight per 100 parts by weight of the monomeric material (a') in the preparation of the polymeric component (a), in an amount of 0.1 parts by weight or more, preferably from 0.1 to 10 parts by weight per 100 parts by weight of the monomeric component (b) in the first polymerization, and in an amount of from 0 to 1.0 parts by weight per 100 parts by weight of the monomeric component (c) in the second polymerization.

The preparation of the polymeric component (a), the first polymerization and the second polymerization each can be effected at a temperature below 100° C., preferably from 40° C. to 95° C. The polymer (II) thus prepared may be mixed with the vinyl chloride polymer (I) by any conventional method. The vinyl chloride polymer composition thus prepared may have incorporated therein any additives, such as stabilizers, lubricants, plasticizers, impact modifiers, coloring matters, fillers, foaming agents, and other processing additives.

The present invention will be illustrated in more detail by the following examples. In the following examples, parts are by weight. The reduced viscosity ($\eta sp/c$) of the polymer was determined from a calibration curve which had been previously provided in terms of $\eta sp/c$ versus the amount of a mercaptan compound in each monomer composition.

EXAMPLE 1

A reaction vessel having a stirrer and a reflux condenser was charged with a mixture of 280 parts of deionized water, 1.5 parts of sodium dioctyl sulfosuccinate, 0.2 parts of ammonium persulfate, 30 parts of methyl methacrylate, and 0.003 parts of n-octyl mercaptan. After the atmosphere within the vessel was replaced with nitrogen, the mixture was heated to a temperature of 65° C. while being stirred. This temperature was maintained for 2 hours, with the mixture being constantly stirred, to provide a polymeric component (a). Then a first monomeric component (b) consisting of a mixture of 30 parts of n-butyl methacrylate, 20 parts of n-butyl acrylate, and 0.5 parts of n-octyl mercaptan was added dropwise to the polymerization mixture in the vessel for one hour. Next, the resultant mixture was stirred at a temperature of 65° C. for 2 hours to carry out the first polymerization. Thereafter, a second monomeric component (c) consisting of a mixture of 20 parts of methyl methacrylate and 0.002 parts of n-octyl melcaptan was added to the above-prepared polymerization mixture for 30 minutes. Then the resultant polymerization mixture was stirred at a temperature of 65° C. for 2 hours so as to effect the second polymerization. After the resultant emulsion was cooled, aluminum chloride was added to the emulsion to cause the polymer to be salted out. Subsequently, the salted-out polymer was filtered, washed, and dried. A polymer (II) was obtained. A predetermined amount of the polymer (II) was mixed with 100 parts of a polyvinyl chloride resin (I) having an average degree of polymerization of 715, 2.0 parts of dibutyl tin mercapto, 1.0 part of an epoxy-type stabilizer, 0.5 parts of dibutyl tin maleate, and 0.3 parts of a lubricant in a Henschel mixer so that a vinyl chloride polymer composition was prepared. The processing properties of the resultant polymer composition are shown in Table 1.

EXAMPLE 2

A polymer was prepared according to the same procedures as those described in Example 1 except that the n-octyl mercaptan was used in an amount of 0.05 parts in the polymeric component (a)-preparing procedure and in an amount of 0.03 parts in the second polymerization procedure.

COMPARATIVE EXAMPLE 1

A polymer was prepared according to the same procedures as those described in Example 1 except that the monomeric component (b) consisted of 30 parts of styrene, 20 parts of n-butyl acrylate, and 0.5 parts of n-octyl mercaptan.

COMPARATIVE EXAMPLE 2

The same reaction vessel as that described in Example 1 was charged with a mixture of 280 parts of deionized water, 1.5 parts of sodium dioctyl sulfosuccinate, 0.2 parts of ammonium persulfate, and a monomeric component (b) consisting of 30 parts of butyl methacrylate, 20 parts of butyl acrylate, and 0.5 parts of n-octyl mercaptan. After the atmosphere within the vessel was replaced with nitrogen, the mixture was heated to a temperature of 65° C. while being stirred. This temperature was maintained for 2 hours, with the mixture being constantly stirred. Subsequently, a monomeric component (c), consisting of a mixture of 50 parts of methyl methacrylate and 0.005 parts of n-octyl mercaptan, was added to the reaction system for 30 minutes. Then the resultant mixture was stirred for 2 hours at a temperature of 65° C. to effect polymerization. After the polymerization reaction, the same procedures as those described in Example 1 were applied to the resultant emulsion. Thus, a polymer was obtained.

COMPARATIVE EXAMPLE 3

A polymer was prepared according to the same procedures as those described in Example 1 except that a polymeric component (a) was prepared from an admixture consisting of a mixture of 20 parts of methyl methacrylate and 0.002 parts of n-octyl mercaptan and a mixture of 30 parts of methyl methacrylate and 0.003 parts of n-octyl mercaptan, no monomeric component (c) being used.

COMPARATIVE EXAMPLE 4

A reaction vessel was charged with a mixture of 280 parts of deionized water, 1.5 parts of sodium dioctyl sulfosuccinate, 0.2 parts of ammonium persulfate, 80 parts of butyl methacrylate, 20 parts of butyl acrylate, and 1.2 parts of n-octyl mercaptan. After the atmosphere within the vessel was replaced with nitrogen, the mixture was heated to a temperature of 65° C. This temperature was maintained for 2 hours, with the mixture being constantly stirred, so as to effect polymerization. After the polymerization reaction, the same procedures as those described in Example 1 were applied to the resultant emulsion. Thus, a polymer was obtained. In Table 1, Comparative Example 5 relates to the vinyl chloride polymer alone.

It is apparent from the results in Table 1 that the composition of Comparative Example 4 containing the single-step polymerization product from all the components (a), (b), and (c) exhibits a remarkably poor lubricating property. The composition of Comparative Example 3 containing the two-step polymerization product from the polymeric component (a) and the monomeric component (b) and the composition of Comparative Example 2 containing the two-step polymerization product from the monomeric components (b) and (c) exhibit a lubricating property greatly inferior to that of the composition of the present invention. Further, the above-mentioned compositions produce some amounts of non-gelled materials. It is also apparent from Table 1 that the composition of Comparative Example 1 exhibits an adequate roll lubricating property, but the lubricity durability, i.e., the stickiness, of the composition is inferior and plate out can be observed. In contrast, the composition of the present invention is excellent in all the processing properties, as is shown in Table 1.

The processing properties indicated in Table 1 were determined in the following manner:

1. Roll Lubricating Property: A total of 100 g of a sample was milled with a pair of milling rolls, each roll having a diameter of 6 inches, at a roll opening of 1 mm for five minutes. One of the rolls had a temperature of 200° C. and the other had a temperature of 195° C. After milling for five minutes the sample was evaluated for releasability from the surface of the roll. The sample was evaluated according to a conventional five point procedure in which 5 indicates maximum releasability and 1 indicates minimum releasability. As the numerical value approaches 5, the lubricating property of the sample improves. In the following tables, phr represents the parts by weight of the polymer per 100 parts by weight of the vinyl chloride resin.

2. Stickiness: A total of 100 g of a sample having the same formulation as the sample used in test 1 was milled with the same rolls used in test 1 at a roll opening of 1 mm. One of the rolls had a temperature of 205° C. and the other had a temperature of 200° C. Milling was continued until the sheet product stuck to the surface of the roll and could not be separated therefrom. Then the milling time was determined. The longer the milling time, the better the lubricity durability at elevated temperatures. In this test, the amount of the polymer added was 1.0 phr.

3. Non-gelled Material, Plate out: A sample having the same formulation as that of the sample used in test 1 and containing 2.0 phr of the polymer was milled for 5 minutes with a pair of milling rolls, one of the rolls having a temperature of 180° C. and the other having a temperature of 175° C. Thereafter, the milled sample was converted to a sheet having a thickness of 0.3 mm. The sheet was evaluated for its remaining non-gelled material. Also, deposits on the surface of the roll were examined to evaluate plate out.

4. Transparency: A sample having the same formulation as that of the sample used in test 1 and containing 2.0 phr of the polymer was milled for 5 minutes. Subsequently, the milled sample was pressed under pressure at a temperature of 185° C. to form a pressed sheet having a thickness of 2 mm. The transparency of the sheet was determined according to Japanese Industrial Standard (JIS) K-6714 by using an integrating sphere-type hazeometer.

5. Blow-Bottle Moldability: A sample consisting of 100 parts of a vinyl chloride resin having an average degree of polymerization of 715, 2.0 parts of dibutyl tin mercapto, 0.5 parts of a dibutyl tin maleate polymer, 1.0 parts of a lubricant, and 1.0 parts of each of the polymers of the above-mentioned examples and comparative examples was extruded by using a blow molding machine having a diameter of 40 mm. Five seconds after extrusion, the weight of the resultant parison was determined to evaluate the flowability, the length thereof was determined to evaluate the drawdown property, and the thickness thereof was determined to evaluate the die swelling property.

6. Gelling Property: A total of 50 g of a sample having the same formulation as that of the sample used in test 1 and containing 3.0 phr of the polymer was placed in a Brabender Plasti-Corder. After the sample was preheated for five minutes, the Plastic-Corder was operated at a temperature of 170° C. and at a rotation speed of 30 rpm. The time Tmax necessary to attain the maximum torque (Mmax) was determined. The shorter the Tmax, the faster the gelling.

7. Tensile Elongation at Elevated Temperatures: A sample having the same formulation as that of the sample used in test 1 and containing 3 phr of the polymer was milled for five minutes with a pair of milling rolls, one of the rolls having a temperature of 200° C. and the other having a temperature of 195° C. The milled sample was pressed under pressure at a temperature of 185° C. to form a pressed sheet having a thickness of 1 mm. The pressed sheet, as a dumbbell specimen, was placed in a tensile testing machine conditioned to a temperature of 150° C., and elongation of the specimen at rupture was determined at a rate of pulling of 50 mm/min.

TABLE 1

|  | Example | | Comparative Example | | | | |
|---|---|---|---|---|---|---|---|
|  | 1 | 2 | 1 | 2 | 3 | 4 | 5 |
| Composition of polymer (II) | | | | | | | |
| Component (a) (parts) | | | | | | | |
| MMA | 30 | 30 | 30 | — | 50 | — | — |
| n-osh/$\eta$ sp/c | 0.03/5.0 | 0.05/1.0 | 0.003/5.0 | — | 0.005/5.0 | — | — |
| Component (b) (parts) | | | | | | | |
|  | | | St/Ba | | | | |
| BMA/BA | 30/20 | 30/20 | 30/20 | 30/20 | 30/20 | 80/20 | (no addition) |
| n-osh/$\eta$ sp/c | 0.5/0.5 | 0.5/0.5 | 0.5/0.6 | 0.5/0.6 | 0.5/0.6 | 1.2/0.6 |  |
| Component (c) (parts) | | | | | | | |
| MMA | 20 | 20 | 20 | 50 | — | — | — |
| n-osh/$\eta$ sp/c | 0.002/5.0 | 0.03/1.0 | 0.002/5.0 | 0.005/5.0 | — | — | — |
| Processing properties | | | | | | | |
| Non-gelled material | slight amount | none | none | some | some | some | (none) |
| Plate out | none | none | some | none | none | none | (slight amount) |
| Blow-bottle moldability | excellent | excellent | excellent | good | good | good | (good) |
| Roll lubricating property | | | | | | | |
| 0.3 phr | 3.0 | 3.4 | 2.2 | — | — | — | — |
| 0.5 phr | 3.5 | 3.7 | 2.8 | 2.0 | 1.6 | 1.8 | — |
| 1.0 phr | 3.8 | 4.0 | 3.5 | 3.0 | 3.0 | 2.9 | — |
| Stickiness 1.0 phr (min) | 19 | 20 | 8 | 7 | 5 | 5 | (7) |
| Gelling property | | | | | | | |
| Tmax (min) | 1.8 | 5.0 | 2.3 | 1.3 | 4.5 | 1.8 | (3.0) |
| Mmax (Kg · m) | 4.8 | 4.0 | 4.7 | 4.9 | 4.0 | 4.6 | (4.5) |
| Transparency | | | | | | | |
| Total transmittance (%) | 83.0 | 83.0 | 85.0 | 84.0 | 83.0 | 80 | (84.0) |
| Haze (%) | 9.6 | 9.2 | 8.0 | 9.2 | 8.6 | 10 | (8.0) |
| Tensile elongation at elevated temperature (%) | 230 | 150 | 230 | 180 | 180 | 220 | (150) |

Note:
MMA: methyl methacrylate
ST: styrene
BA: n-butyl acrylate
BMA: butyl methacrylate
n-osh: n-octyl mercaptan
The words in parentheses represent the processing properties of the composition containing no polymer (II).

EXAMPLES 3 THROUGH 7 AND COMPARATIVE EXAMPLES 6 AND 7

In each of Examples 3 through 7 and Comparative Examples 6 and 7, a polymer (II) was prepared according to the same procedures as those described in Example 1 except that the polymeric component (a) was prepared from 30 parts of methyl methacrylate, the monomeric component (b) consisted of 25 parts of ethyl methacrylate and 25 parts of butyl acrylate, the monomeric component (c) consisted of 20 parts of methyl methacrylate, and the $\eta$sp/c of the polymeric component (a) and polymers resulting from the respective monomeric components (b) and (c) was adjusted to the value shown in Table 2 by using varying amounts of n-octyl mercaptan.

A predetermined amount of the resultant polymer was mixed with 100 parts of a polyvinyl chloride resin having an average degree of polymerization of 715, 2.0 parts of dibutyl tin mercapto, 1.0 part of an epoxy-type stabilizer, 0.5 parts of a dibutyl tin maleate, and 0.3 parts of a lubricant so as to form a vinyl chloride resin composition.

The processing properties of the resultant compositions were determined. The results are shown in Table 2. It is apparent from the results in Table 2 that when the polymer resulting from the component (b) exhibits a $\eta$sp/c of 1.0 or more, the resultant composition exhibits a poor lubricating property and, simultaneously, produces a certain amount of non-gelled materials, while the compositions of the present invention are excellent in all the processing properties as compared with the compositions of the comparative examples.

TABLE 2

|  | Example | | | | | Comparative Example | |
|---|---|---|---|---|---|---|---|
|  | (3) | (4) | (5) | (6) | (7) | (6) | (7) |
| Composition of polymer | | | | | | | |
| Component (a) (parts) | | | | | | | |
| MMA | 30 | 30 | 30 | 30 | 30 | 30 | 30 |
| n-osh/$\eta$ sp/c | 0.04/1.5 | 0.05/1.0 | 0.05/1.0 | 0.003/5.0 | 0.05/1.0 | 0.05/1.0 | 0.003/5.0 |
| Component (b) (parts) | | | | | | | |
| EMA/BA | 25/25 | 25/25 | 25/25 | 25/25 | 25/25 | 25/25 | 25/25 |
| n-osh/$\eta$ sp/c | 0.5/0.5 | 0.5/0.5 | 0.5/0.5 | 0.5/0.5 | 0.4/0.7 | 0.2/1.3 | 0.2/1.3 |
| Component (c) (parts) | | | | | | | |
| MMA | 20 | 20 | 20 | 20 | 20 | 20 | 20 |
| n-osh/$\eta$ sp/c | 0.02/2.0 | 0.03/1.0 | 0.01/3.0 | 0.002/5.0 | 0.02/2.0 | 0.02/2.0 | 0.002/5.0 |
| Processing properties | | | | | | | |
| Non-gelled material | none | none | slight amount | slight amount | none | some | some |

TABLE 2-continued

|  | Example | | | | | Comparative Example | |
| --- | --- | --- | --- | --- | --- | --- | --- |
|  | (3) | (4) | (5) | (6) | (7) | (6) | (7) |
| Plate out | none | none | none | none | none | none | none |
| Blow-bottle moldability | excellent | excellent | excellent | excellent | excellent | excellent, containing non-gelled material | excellent, containing non-gelled material |
| Roll lubricating property | | | | | | | |
| 0.3 phr | 3.2 | 3.5 | 3.3 | 2.8 | 2.9 | 2.8 | 2.5 |
| 0.5 phr | 3.5 | 3.8 | 3.6 | 3.3 | 3.2 | 3.0 | 2.8 |
| 1.0 phr | 4.0 | 4.2 | 4.0 | 3.7 | 3.8 | 3.8 | 3.6 |
| Stickiness (1.0 phr) | 16 | 16 | 14 | 12 | 14 | 6 | 4 |
| Transparency | | | | | | | |
| Total transmittance (%) | 83 | 83 | 83 | 84 | 82 | 83 | 82 |
| Haze (%) | 9.0 | 9.5 | 9.8 | 9.2 | 10.2 | 10.0 | 10.0 |

EMA: ethyl methacrylate

EXAMPLES 8 THROUGH 11 AND COMPARATIVE EXAMPLES 8 AND 9

In each of Examples 8 through 11 and Comparative Examples 8 and 9, a polymer (II) was prepared according to the same procedures as those described in Example 1 except that the monomeric component (b) consisted of 30 parts of ethyl methacrylate and 20 parts of n-butyl acrylate, the monomeric component (c) consisted of the compounds shown in Table 3 and the polymeric component (a) was prepared from the monomers shown in Table 3, and n-octyl mercaptan was added in the amount indicated in Table 3.

Using each of the resultant polymers (II), a vinyl chloride polymer composition was prepared according to the same formulation as that described in Example 1. The processing properties of the resultant compositions were determined. The results are shown in Table 3.

Table 3 clearly indicates that even if the monomeric components (b) and (c) are used in amounts within the range defined by the present invention, when n-butyl acrylate, which is a comonomer for the methyl methacrylate used for preparing the polymeric component (a), exceeds 50%, the resultant composition exhibits a stickiness (i.e., lubricity durability) substantially inferior to that of the composition of Example 8. Also, Table 3 clearly indicates that even if the components (a) and (b) are used in amounts within the range defined by the present invention, when the butyl acrylate in the component (c) exceeds 50%, the resultant composition exhibits a stickiness substantially inferior to that of the composition of Example 10.

TABLE 3

|  | Example | | | | Comparative Example | |
| --- | --- | --- | --- | --- | --- | --- |
|  | (8) | (9) | (10) | (11) | (8) | (9) |
| Composition of polymer | | | | | | |
| Component (a) (parts) | | | | | | |
| MMA | MMA/BA 25/5 | MMA/BA 25/5 | 30 | MMA/BA 25/5 | MMA/BA 12/18 | 30 |
| n-osh/η sp/c | 0.003/4.0 | 0.05/1.0 | 0.003/5.0 | 0.003/4.0 | 0.001/4.0 | 0.003/5.0 |
| Component (b) (parts) | | | | | | |
| EMA/BA | 30/20 | 30/20 | 30/20 | 30/20 | 30/20 | 30/20 |
| n-osh/η sp/c | 0.5/0.6 | 0.5/0.6 | 0.5/0.6 | 0.5/0.6 | 0.5/0.6 | 0.5/0.6 |
| Component (c) (parts) | | | | | | |
| MMA | 20 | 20 | MMA/BA 15/5 | MMA/BA 15/15 | 20 | MMA/BA 8/12 |
| n-osh/η sp/c | 0.002/5.0 | 0.03/1.0 | 0.002/3.0 | 0.002/4.0 | 0.002/5.0 | 0.0015/3.0 |
| Processing properties | | | | | | |
| Non-gelled material | slight amount | none | none | none | some | slight amount |
| Plate out | none | none | none | none | none | none |
| Blow-bottle moldability | excellent | excellent | excellent | excellent | excellent | excellent |
| Roll lubricating property | | | | | | |
| 0.3 phr | 2.9 | 3.2 | 2.8 | 2.8 | 2.0 | 2.0 |
| 0.5 phr | 3.2 | 3.6 | 3.1 | 3.1 | 2.8 | 2.8 |
| 1.0 phr | 3.5 | 4.0 | 3.6 | 3.6 | 3.4 | 3.1 |
| Stickiness | 18 | 18 | 17.5 | 18 | 7 | 6 |
| Gelling property | | | | | | |
| Tmax (min) | 1.3 | 3.5 | 1.4 | 1.2 | 1.5 | 1.4 |
| Mmax (kg · m) | 4.9 | 4.2 | 4.9 | 4.9 | 4.6 | 4.5 |
| Tensile elongation at elevated temperature | 220 | 160 | 210 | 200 | 190 | 180 |

EXAMPLES 12 THROUGH 14 AND COMPARATIVE EXAMPLES 10 AND 11

In each of Examples 12 through 14 and Comparative Examples 10 and 11, a polymer (II) was prepared according to the same procedures as those described in Example 1 except that the monomeric component (b) had the composition shown in Table 4.

Using each of the resultant polymers, a vinyl chloride resin composition was prepared according to the same formulation as that described in Example 3. The processing properties of the resultant compositions were determined. The results are shown in Table 4.

Table 4 clearly indicates that the ethyl methacrylate in the component (b) (Comparative Example 10) and the methyl methacrylate in the component (b) (Comparative Example 11) are, respectively, greater than 70%, the resultant compositions exhibiting a substantially decreased roll lubricating property and stickiness.

initiator consisting of 1 part by weight of cumenhydroperoxide and 1 part by weight of sodium formaldehyde sulfoxylate was used in place of ammonium persulfate.

In Example 18, the same procedures as those described in Example 1 were carried out except that an initiator consisting of 0.2 parts by weight of potassium persulfate and 0.2 parts by weight of sodium sulfite was used in place of ammonium sulfate.

In Comparative Example 12, the same procedures as those described in Example 1 were carried out except that ammonium persulfate was used in an amount of 0.001 parts by weight.

In Comparative Example 13, the same procedures as those described in Example 1 were carried out except that no chain transfer agent was used.

The properties of the resultant compositions are indicated in Table 5.

TABLE 4

|  | Example | | | Comparative Example | |
|---|---|---|---|---|---|
|  | (12) | (13) | (14) | (10) | (11) |
| Composition of polymer | | | | | |
| Component (a) (parts) | | | | | |
| MMA | 30 | 30 | 20 | 30 | 30 |
| n-osh/η sp/c | 0.05/1.0 | 0.05/1.0 | 0.05/1.0 | 0.05/1.0 | 0.003/5.0 |
| Component (b) (parts) | | | | | |
| Monomer composition | BA | EMA/BA | EMA/BA | EMA/BA | EMA/BA |
|  | 50 | 35/15 | 35/30 | 45/5 | 45/5 |
| n-osh/η sp/c | 0.5/0.5 | 0.5/0.5 | 0.6/0.5 | 0.6/0.5 | 0.6/0.5 |
| Component (c) | | | | | |
| MMA | 20 | 20 | 15 | 20 | 20 |
| n-osh/η sp/c | 0.03/1.0 | 0.03/1.0 | 0.03/1.0 | 0.03/1.0 | 0.002/5.0 |
| Processing properties | | | | | |
| Non-gelled material | none | none | none | none | some |
| Plate out | none | none | none | none | none |
| Roll lubricating property | | | | | |
| 0.3 phr | 2.9 | 2.8 | 3.0 | — | — |
| 0.5 phr | 3.5 | 3.3 | 3.4 | 1.5 | 1.5 |
| 1.0 phr | 3.9 | 3.7 | 3.8 | 2.6 | 2.5 |
| Stickiness | 20 | 14 | 18 | 5 | 5 |
| Transparency | | | | | |
| Total transmittance (%) | 80 | 83 | 81 | 83 | 84 |
| Haze (%) | 11.2 | 9.2 | 11.0 | 9.0 | 9.0 |

EXAMPLES 15 THROUGH 18 AND COMPARATIVE EXAMPLES 12 AND 13

In Example 15, the same procedures as those described in Example 1 were carried out except that n-butyl mercaptan in the amount indicated in Table 5 was used in place of n-octyl mercaptan.

In Example 16, the same procedures as those described in Example 1 were carried out except that polyoxyethylene alkylether was used in place of sodium dioctyl sulfosuccinate.

In Example 17, the same procedures as those described in Example 1 were carried out except that an

TABLE 5

| Item | | Example | | | | Comparative Example | |
|---|---|---|---|---|---|---|---|
|  |  | 15 | 16 | 17 | 18 | 12 | 13 |
| Composition of polymer (II) | | | | | | | |
| Component (a) (parts) | | | | | | | |
| MMA |  | 30 | 30 | 30 | 30 | 30 | 30 |
| Chain transfer agent | type | n-BM | n-osh | n-osh | n-osh | n-osh | none |
|  | amount | 0.005 | 0.005 | 0.05 | 0.5 | 0.05 | 0 |
| η sp/c |  | 4.0 | 4.0 | 1.0 | 1.0 | 3.0 | 10 |
| Component (b) (parts) | | | | | | | |
| BMA/BA |  | 30/20 | 30/20 | 30/20 | 30/20 | 30/20 | 30/20 |
| Chain transfer agent | type | n-BM | n-osh | n-osh | n-osh | n-osh | none |
|  | amount | 0.5 | 0.5 | 0.5 | 0.5 | 0.5 | 0 |
| η sp/c |  | 0.5 | 0.5 | 0.5 | 0.5 | 2.0 | 7 |
| Component (c) (parts) | | | | | | | |
| MMA |  | 20 | 20 | 20 | 20 | 20 | 20 |
| Chain transfer agent | type | n-BM | n-osh | n-osh | n-osh | n-osh | none |
|  | amount | 0.003 | 0.003 | 0.03 | 0.03 | 0.03 | 0 |
| η sp/c |  | 4.0 | 4.0 | 1.0 | 1.0 | 4.0 | 8 |
| Processing properties | | | | | | | |
| Non-gelled material |  | none | none | none | none | some | some |
| Plate out |  | none | none | none | none | some | some |
| Roll lubricating | | | | | | | |

TABLE 5-continued

| Item | Example | | | | Comparative Example | |
|---|---|---|---|---|---|---|
| | 15 | 16 | 17 | 18 | 12 | 13 |
| property | | | | | | |
| 0.3 phr | 3.2 | 3.4 | 3.2 | 3.0 | — | — |
| 0.5 phr | 3.6 | 3.9 | 3.8 | 3.7 | — | — |
| 1.0 phr | 3.9 | 4.0 | 4.0 | 3.9 | 1.5 | 1.6 |
| Stickiness 1.0 phr (min) | 20 | 18 | 20 | 20 | 3 | 3 |

Note:
n-BM—n-butylmercaptan

In Examples 15 through 18, wherein the emulsifying agent, the initiator, and the chain transfer agents were used in accordance with the present invention, the resultant compositions exhibited satisfactory processing properties, especially stickiness.

In Comparative Example 12, wherein the initiator was used in an amount falling outside of the scope of the present invention, the reduced viscosity ηsp/c of the first polymerization product fell outside of the scope of the present invention, and, therefore, the resultant composition exhibited poor processing properties, especially a poor stickiness.

In Comparative Example 13, wherein no chain transfer agent was used, the reduced viscosity ηsp/c of the first polymerization product was undesirably large and the resultant composition exhibited poor processing properties, especially a poor stickiness.

1. A vinyl chloride polymer composition having an excellent workability, comprising:
   (1) from 80% to 99.95% by weight of a polymeric ingredient (I) consisting of at least one member selected from the group consisting of polyvinyl chloride and copolymers of at least 80% by weight of vinyl chloride and no more than 20% by weight of at least one other ethylenically unsaturated comonomer; and
   (2) from 0.05% to 20% by weight of a polymeric ingredient (II) consisting of at least one three-stage emulsion polymerization product prepared by the steps of:
      (A) first polymerizing from 40 to 70 parts by weight of a first monomeric component (b) in the presence of from 5 to 45 parts by weight of a polymeric component (a) obtaining a first polymerization product, said first polymerizing being conducted in a medium containing at least 0.1 parts by weight of a chain transfer agent per 100 parts by weight of said first monomeric component (b) under polymerization conditions which will cause a solution of 0.1 g of a polymerization product from said monomeric component (b) alone in 100 ml of chloroform to exhibit a reduced viscosity of 1 or less at a temperature of 25° C., said polymeric component (a) being prepared by polymerizing at least one monomeric material (a') selected from the group consisting of methyl methacrylate and monomeric mixtures of at least 50% by weight of methyl methacrylate or no more than 50% by weight of at least one other ethylenically unsaturated comonomer in the presence of from 0 to 2.0 parts by weight of a chain transfer agent per 100 parts by weight of said monomeric material (a'), and said first monomeric component (b) consisting of a member selected from the group consisting of (1) alkyl acrylates in which the alkyl group has from 1 to 18 carbon atoms, (2) benzyl acrylate, (3) mixtures thereof and (4) monomeric mixtures of at least 30% by weight of at least one member selected from the group consisting of alkyl acrylates in which the alkyl group has from 1 to 18 carbon atoms and benzyl acrylate and no more than 70% by weight of at least one member selected from the group consisting of alkyl methacrylates in which the alkyl group has from 2 to 18 carbon atoms and benzyl methacrylate; and
      (B) second polymerizing, in the presence of the first polymerization product, from 5 to 40 parts by weight of a second monomeric component (c) consisting of a member selected from the group consisting of methyl methacrylate and monomeric mixtures of at least 50% by weight of methyl methacrylate and no more than 50% by weight of at least one other ethylenically unsaturated comonomer copolymerizable with methyl methacrylate in the presence of from 0 to 1.0 part by weight of a chain transfer agent per 100 parts by weight of said second monomeric component (c), the sum of the polymeric component (a), the first monomeric component (b), and the second monomeric component (c) being 100 parts by weight, and the preparation of said polymeric component (a) and said first and second polymerization reactions being carried out at a temperature of below 100° C. in the presence of from 0.1 to 20 parts by weight of an emulsifying agent and from 0.05 to 10 parts by weight of an initiator per 100 parts by weight of the sum of said components (a), (b) and (c).

2. The composition as claimed in claim 1, comprising:
   (1) from 99.9% to 80% by weight of a polymeric ingredient (I) consisting of at least one member selected from the group consisting of polyvinyl chloride and copolymers of at least 80% by weight of vinyl chloride and no more than 20% by weight of another ethylenically unsatured comonomer; and
   (2) from 0.1% to 20% by weight of a polymeric ingredient (II) consisting of at least one three-stage emulsion polymerization product prepared by the steps of: (A) first polymerizing, in the presence of from 10 to 45 parts by weight of a polymeric component (a) consisting of at least one member selected from the group consisting of polymethyl methacrylate and copolymers of at least 80% by weight of methyl methacrylate and no more than 20% by weight of at least one other ethylenically unsaturated comonomer, from 40 to 70 parts by weight of a first monomeric component (b') consisting of a mixture of from 30% to 70% by weight of at least one member selected from the group consisting of alkyl acrylates in which the alkyl group has from 1 to 18 carbon atoms and benzyl methacrylate and from 30% to 70% by weight of at least one member selected from the group consisting of alkyl methacrylates in which the alkyl group has from 1 to 18 carbon atoms and benzyl methacrylate under a polymerization condition which will cause a solution of 0.1 g of a polymerization product of said first monomeric component (b') alone in 100 ml of chloroform to exhibit a reduced viscosity of 1.0 or less at a temperature of 25° C. and (B) second polymerizing in the presence of the first polymerization product, from 5 to 40 parts by weight of a second monomeric component (c) as specified in claim 1.

3. The composition as claimed in claim 1, wherein said polymeric component (a) has a reduced viscosity of no more than 2.0 measured at a concentration of 0.1 g/100 ml of chloroform at a temperature of 25° C.

4. The composition as claimed in claim 1, wherein the amounts of said polymeric component (a), said first monomeric component (b), and said second monomeric component (c) are, respectively, from 20 to 40 parts, from 50 to 60 parts, and from 5 to 40 parts by weight, the sum of the above-mentioned components (a), (b), and (c) being 100 parts by weight.

5. The composition as claimed in claim 1, wherein said polymeric component (a) consists of a polymethyl methacrylate.

6. The composition as claimed in claim 1, wherein said alkyl acrylate in said first monomeric component (b) is selected from the group consisting of ethyl acrylate, n-propyl acrylate, isopropyl acrylate, n-butyl acrylate, isobutyl acrylate, t-butyl acrylate, octyl acrylate, and 2-ethyl hexyl acrylate.

7. The composition as claimed in claim 1, wherein said second monomeric component (c) consists of methyl methacrylate.

8. The composition as claimed in claim 1, wherein said polymeric component (a) consists of polymethyl methacrylate alone, said first monomeric component (b) consists of at least one member selected from the group consisting of ethyl acrylate, n-propyl acrylate, isopropyl acrylate, n-butyl acrylate, isobutyl acrylate, t-butyl acrylate, octyl acrylate, 2-ethylhexyl acrylate, and benzyl acrylate, and said second monomeric component (c) consists of methyl methacrylate.

9. The composition as claimed in claim 1, wherein said emulsifying agent consists of at least one surface active compound selected from the group of fatty acid salts, alkylbenzene sulfonic acid salts, alkylnaphthalene sulfonic acid salts, alkylsulfosuccinic acid salts, alkylphosphoric ester salts, polyoxyethylenealkyl sulfuric ester salts, polyoxyethyleneethersulfate salts, sarcosinic acid salts, polyoxyethylenealkylethers, polyoxyethylenealkylphenolethers, polyoxyethylenesorbitane fatty acid esters, sorbitane fatty acid esters, polyoxyethylene fatty acid esters, polyethylene glycol fatty acid esters, and polyoxyethylenealkylether phosphoric esters.

10. The composition as claimed in claim 1, wherein said emulsifying agent is in an amount of from 0.1 to 10 parts by weight per 100 parts by weight of the sum of the weights of the components (a), (b), and (c).

11. The composition as claimed in claim 1, wherein said initiator consists of at least one compound selected from the group consisting of sodium persulfate, ammonium persulfate, potassium persulfate, benzoyl peroxide, lauroyl peroxide, tert-butylhydroperoxide, di-tert-butylhydroperoxide, cumenhydroperoxide, di-isopropylbenzene peroxide, and redox mixtures of at least one member selected from the above-mentioned group and at least one member selected from the group consisting of sulfites, hydrogen sulfites, thiosulfates, pyrophosphates, sodium formaldehyde sulfoxylates, ferrous salts, and copper sulfate.

12. The composition as claimed in claim 1, wherein said initiator is in an amount of from 0.1 to 10 parts by weight per 100 parts by weight of the sum of said components (a), (b), and (c).

13. The composition as claimed in claim 1, wherein said chain transfer agent used in said first polymerization consists of at least one member selected from the group consisting of alkyl mercaptans having from 4 to 20 carbon atoms, thiophenol, benzylmercaptan, butyl thioglycolate, octyl thioglycolate, methoxybutyl thioglycolate, octyl $\beta$-mercaptopropionate, and methoxybutyl $\beta$-mercaptopropionate.

14. The composition as claimed in claim 1, wherein said chain transfer agent is in an amount of from 0.1 to 10 parts by weight per 100 parts by weight of said monomeric component (b).

* * * * *